United States Patent [19]

Hinksman et al.

[11] Patent Number: 4,923,350
[45] Date of Patent: May 8, 1990

[54] LAMINATED LOCKING STAPLE

[76] Inventors: Patrick B. Hinksman, Denewood, 67 White Hill, Kinver, Near Stourbridge, West Midlands; Gary R. Long, 14 Riberland, Astley Burf, Stourport-on-Severn, West Midlands, both of England

[21] Appl. No.: 227,339

[22] Filed: Aug. 2, 1988

[30] Foreign Application Priority Data

Aug. 4, 1987 [GB] United Kingdom ................. 8718392

[51] Int. Cl.⁵ ............................................. F16B 15/00
[52] U.S. Cl. .................... 411/457; 411/522; 411/352; 411/461; 411/920; 285/305
[58] Field of Search ............... 411/352, 353, 513, 515, 411/516, 522, 523, 524, 945, 946, 457, 920, 469, 461, 478; 285/305; 403/378, 379, 155

[56] References Cited

U.S. PATENT DOCUMENTS 1,948,462  2/1934  Le Page ........................ 411/457 X
1,983,373 12/1934  Horton ........................... 411/457 X
3,527,485  9/1970  Goward et al. .................... 285/305
4,275,813  6/1981  Noiles ........................... 411/457 X
4,431,218  2/1984  Paul, Jr. et al. ................. 285/305
4,433,861  2/1984  Kreczik ........................... 285/305
4,708,558 11/1987  Musil ............................. 411/457

FOREIGN PATENT DOCUMENTS 1914465 10/1970  Fed. Rep. of Germany ...... 285/305
 941545 11/1963  United Kingdom .............. 285/305

Primary Examiner—Gary L. Smith
Assistant Examiner—Suzanne L. Dino
Attorney, Agent, or Firm—Berman, Aisenberg & Platt

[57] ABSTRACT

A hose coupling or pipe connection (10) has detachable parts (20, 22) which are releasably locked together by two U-shaped cotter pins or locking staples (18) in accordance with the invention, the cotter pins or locking staples being of laminated form and comprising two or more joined-together leaves or plies (26, 28).

11 Claims, 2 Drawing Sheets

LAMINATED LOCKING STAPLE

BACKGROUND OF THE INVENTION

This invention relates to a generally U-shaped laminated cotter pin or locking staple, especially for use in detachable hose couplings or pipe or tube connections.

British Patent No. 941,545 describes hose or pipe connections and couplings wherein a U-shaped cotter pin is used to hold two parts of the connection or coupling together in a detachable manner. Such an arrangement has the advantage that unsatisfactory connecting means such as screw joints or bayonet joints wherein a turning or twisting motion is required are completely avoided. This is of particular advantage in mines and other underground workings where hose or pipe connections or couplings are frequently located in inaccessible and inconvenient places.

The present invention is concerned with an improvement in the U-shaped cotter pin described in British Patent No. 941,545, and arises out of an emerging market demand for cotter pins or locking staples which can accept the high levels of dynamic loading which are experienced in modern hydraulic installations such as those used in mines.

SUMMARY OF THE INVENTION

With this consideration in mind, the present invention is directed to a generally U-shaped laminated cotter pin or locking staple comprising two or more joined-together leaves or plies. The invention also extends to couplings and connections incorporating such a staple.

It is surprising from an engineering point of view that a laminated cotter pin or locking staple of this construction can accept higher levels of dynamic loading than a solid cotter pin or staple of the construction shown in British Patent No. 941,545 even if the width of the prior staple is increased so as to be, say, twice that of the cotter pin illustrated in that Patent. It is however a fact that the laminated cotter pin or locking staple with which the present invention is concerned gives substantially better results than a solid cotter pin or locking staple of increased width.

The leaves or plies of the cotter pin or staple can be joined together—for example by welding—at or near their free ends and/or at the curved intermediate portion of the cotter pin or staple. However, as will be explained below, other ways of joining the leaves or plies together are possible. The benefit of joining the leaves or plies together is that the cotter pin or staple will then be inserted into a hose or pipe connection or coupling as a unit. Thus, if the leaves or plies were not to be joined in this way, it would then make it possible for a mining technician to insert only one ply or leaf into a connection or coupling which could be hazardous under normal operating conditions. Alternatively, he might insert a nail or other unsatisfactory packing element to take the place of a second leaf or ply.

BRIEF DESCRIPTION OF THE DRAWINGS

Some examples of laminated cotter pins or locking staples in accordance with the invention are illustrated in the accompanying drawings, in which.

DETAILED DESCRIPTION OF THE PREFERRED EMBODIMENTS

Figure 1:
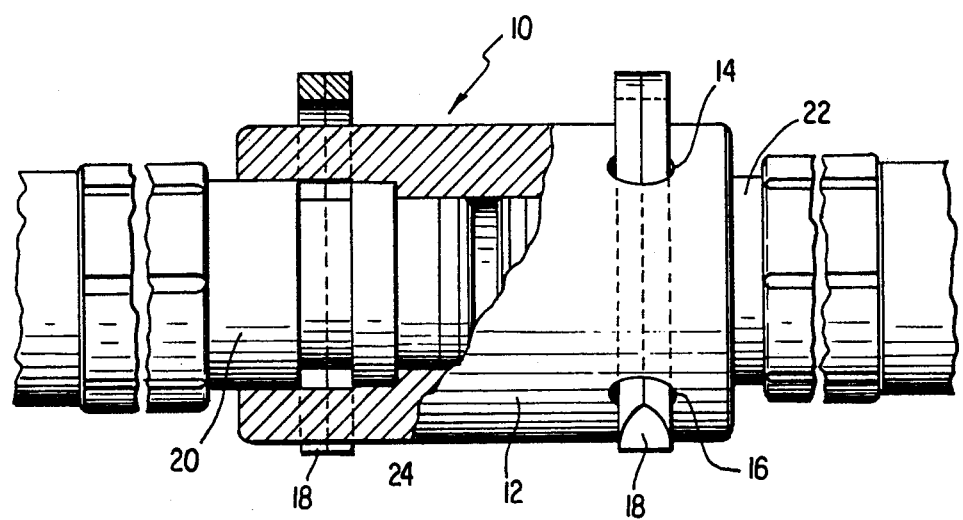
- FIG. 1 is a part-sectional side view through a hose or pipe connection or coupling having detachable parts which are locked together by two U-shaped laminated cotter pins or locking staples in accordance with the invention.

FIG. 1 shows a hose or pipe connection or coupling 10 for use, for example, in mining installations to convey hydraulic fluid under pressure to and from mining equipment. It includes a sleeve 12 having two pairs of circular openings 14 and 16 on either side of a vertical plane passing through the longitudinal axis of the sleeve which receive respective U-shaped cotter pins or locking staples 18 which lock the sleeve on to respective coupling members 20 and 22. For this purpose, the two coupling members 20 and 22 are each provided with an annular groove 24 which tangentially receives portions of the legs of the respective staples 18. Locking of the two coupling members 20 and 22 on to the sleeve 18 is therefore effected by inserting the staples into the respective holes 14 and 16 and by withdrawing the staples from those holes when it is desired to detach the parts of the coupling from each other.

Figure 2:
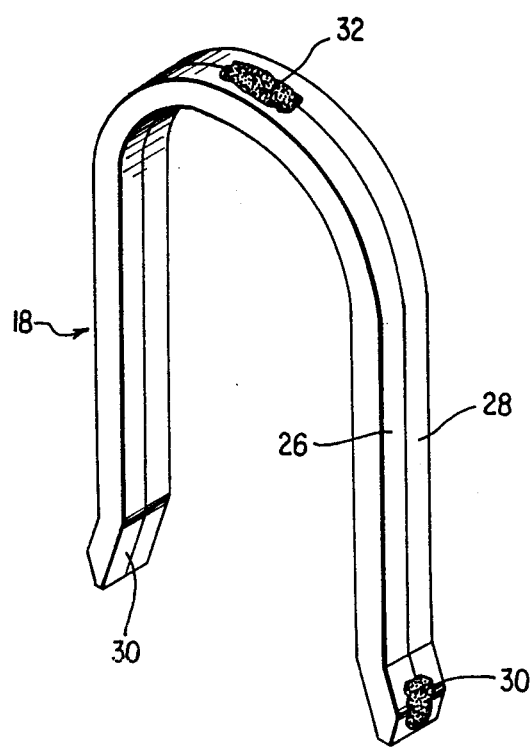
FIG. 2 is an enlarged perspective view of either one of the two cotter pins or locking staples shown in FIG. 1.

Because of the high levels of dynamic loading which are experienced in modern hydraulic installations, each staple 18 is made of laminated form as shown in FIG. 2 so as to comprise two joined-together leaves or plies 26 and 28. These two plies are of exactly the same shape as each other and they are welded together at their free ends 30 and at their curved intermediate portions 32. This means that their opposing surfaces, whilst being in close contact with each other, are joined at only three spaced-apart points. Surprising as it may seem, such a construction gives better results from the point of view of resistance to dynamic loading than a single solid staple having the same width as that shown in FIG. 2.

Although FIGS. 2 to 6 each show a staple made from square-sectioned plies, substantially any cross-sectional shape for each ply is possible, for example round section or hexagonal section. Furthermore, one of the plies of one staple may have a different cross section from the other ply of that same staple.

Figure 3:
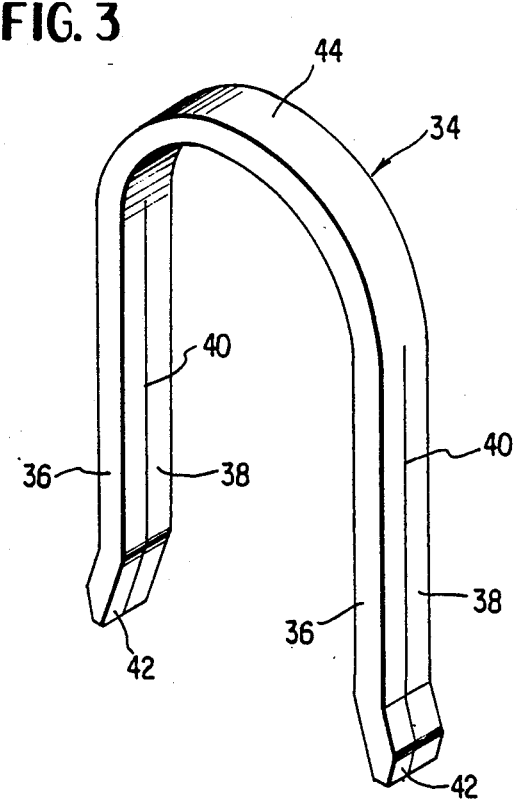
FIGS. 3-6 are perspective views similar to FIG. 2 of four further forms of cotter pin or locking staple in accordance with the invention.

FIGS. 3 to 6 show alternative forms of staples which achieve the same results as that shown in FIG. 2. Thus, FIG. 3 shows a staple 34 having two plies 36 and 38 formed by cutting slits 40 in the two legs of the staple from their extreme ends 42. In this case, therefore, the two plies 36 and 38 are joined together over the solid curved central section 44 of the staple.

Figure 4:
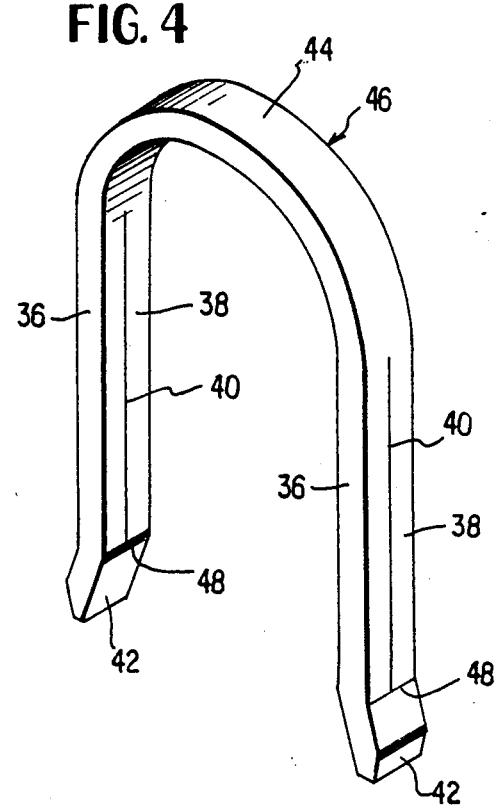

FIG. 4 illustrates a similar form of staple 46 to that shown in FIG. 3 except that the slits 40 start from a point 48 displaced upwardly by a small distance from the extreme ends 42 of the staple. In other words, the two plies 36 and 38 in this construction are joined together both at the central portion 44 of the staple and at their end portions.

Figure 5:
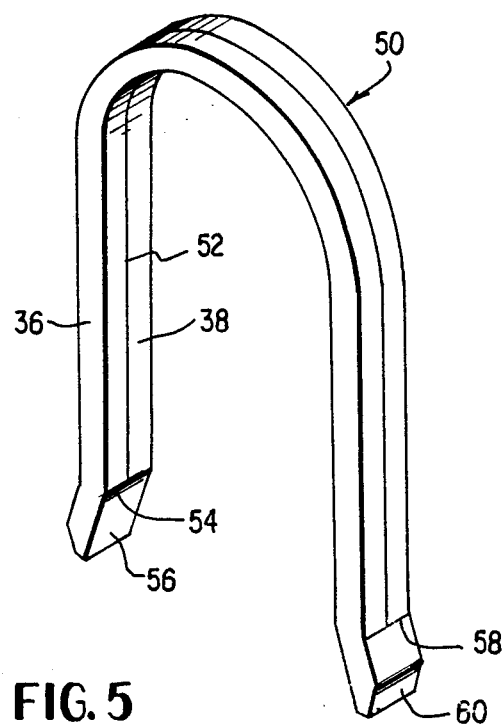

The staple 50 shown in FIG. 5 has the plies 36 and 38 separated by a single slit 52 which extends without interruption from a point 54 near the extreme end 56 of one leg around to a corresponding point 58 displaced from the extreme end 60 of the other leg. This means that the staple 50 has its plies joined together at the end portions only.

Figure 6:
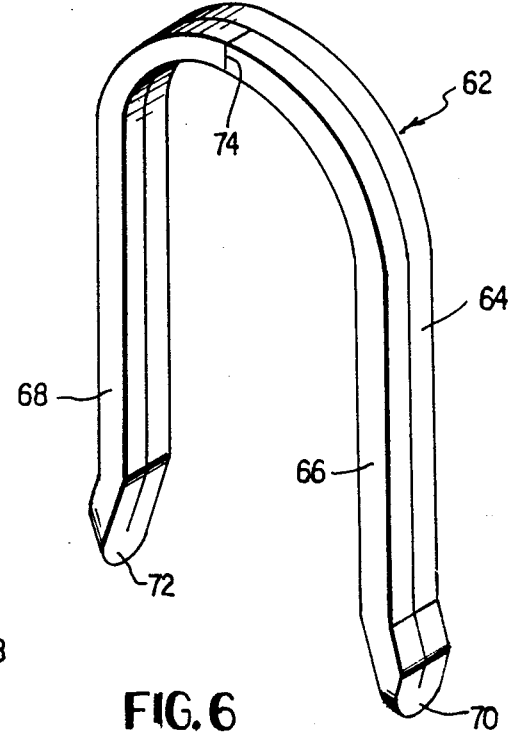

FIG. 6 shows a staple 62 made of a single length of metal which is first bent into a U-shape so as to form one ply 64, after which the portions 66 and 68 are bent round at 70 and 72 respectively so as to form a second ply having a welded-together butt joint 74 where the two bent-round portions 66 and 68 meet one another. The two plies of the staple 62 are therefore joined together at the portions 70 and 72.

Although the various staples shown in the drawings are all provided with just two plies, it is to be understood that staples in accordance with the invention can have three or more plies where this is desired.

Staples in accordance with the invention will normally be made of high-quality steel to enable them to withstand the dynamic loading to which they are subjected during normal use of hose or pipe connections or couplings with which they are used. Where it is desirable to prevent rusting or corrosion of the staples, they could of course be made of a non-corroding metal or alloy such as stainless steel or bronze.

We claim:

1. A generally U-shaped unitary fluid couplings locking means having two legs with free ends and a curved central portion made of metal and adapted to hold together, in a detachable manner, two parts of a hose coupling, pipe connection or tube connection, the locking means being of rectangular cross-section substantially throughout its length to provide, on both sides of the locking means, flat side surfaces subject, in use, to dynamic loading, wherein said locking means comprises first and second U-shaped elements of rectangular cross-section arranged face-to-face with opposed flat faces of the elements in abutting contact whereby dynamic loading is transmitted through the opposed abutting flat faces from one element to the other, and connections means connecting the two U-shaped elements together in a permanent manner so that they cannot be separated.

2. Locking means according to claim 1, wherein the two U-shaped elements are connected together adjacent their free end portions.

3. Locking means according to claim 1, wherein the two U-shaped elements are connected together at the curved central portion of the locking means.

4. Locking means according to claim 1, wherein the two U-shaped elements are of exactly the same shape as each other.

5. Locking means according to claim 1, wherein the two U-shaped elements are each of square cross-section.

6. Locking means according to claim 1, wherein the connection means comprises weld metal.

7. A generally U-shaped fluid coupling locking means having two legs with extreme ends and a curved central portion made from a single piece of metal and adapted to hold together, in a detachable manner, two parts of a hose coupling, pipe connection or tube connection, the locking means being of rectangular cross-section substantially throughout its length to provide, on both sides of the locking means, flat side surfaces subject, in use, to dynamic loading, wherein said locking means is partially divided into first and second U-shaped elements of rectangular cross-section by at least one longitudinally-extending through-slit in the metal of the locking means, said U-shaped elements nonetheless remaining permanently connected to each other by metal which is not slit.

8. Locking means according to claim 7, wherein two slits are formed in the two legs of the locking means, which slits stop short of the curved central portion of the locking means.

9. Locking means according to claim 7, wherein two slits which start from points displaced from the extreme ends of the locking means stop short of the curved central portion of the locking means.

10. Locking means according to claim 7, wherein a single slit extends without interruption from a point near the extreme end of one leg of the locking means around to a corresponding point displaced from the extreme end of the other leg wherein the two U-shaped elements are connected together at their end portions only.

11. A generally U-shaped fluid coupling locking means made from a single piece of metal and adapted to hold together, in a detachable manner, two parts of a hose coupling, pipe connection or tube connection, the locking means being of rectangular cross-section substantially throughout its length to provide on both sides of the locking means, flat side surfaces subject, in use, to dynamic loading, wherein said locking means is made from a single length of metal which is first bent into a U-shape and which then has end portions bent round into two half-U portions, there being a butt-welded joint where ends of the two half-U portions meet each other.

* * * * *